L. H. MATTINGLY.
UNIVERSAL JOINT.
APPLICATION FILED OCT. 7, 1919.
1,333,988.
Patented Mar. 16, 1920.
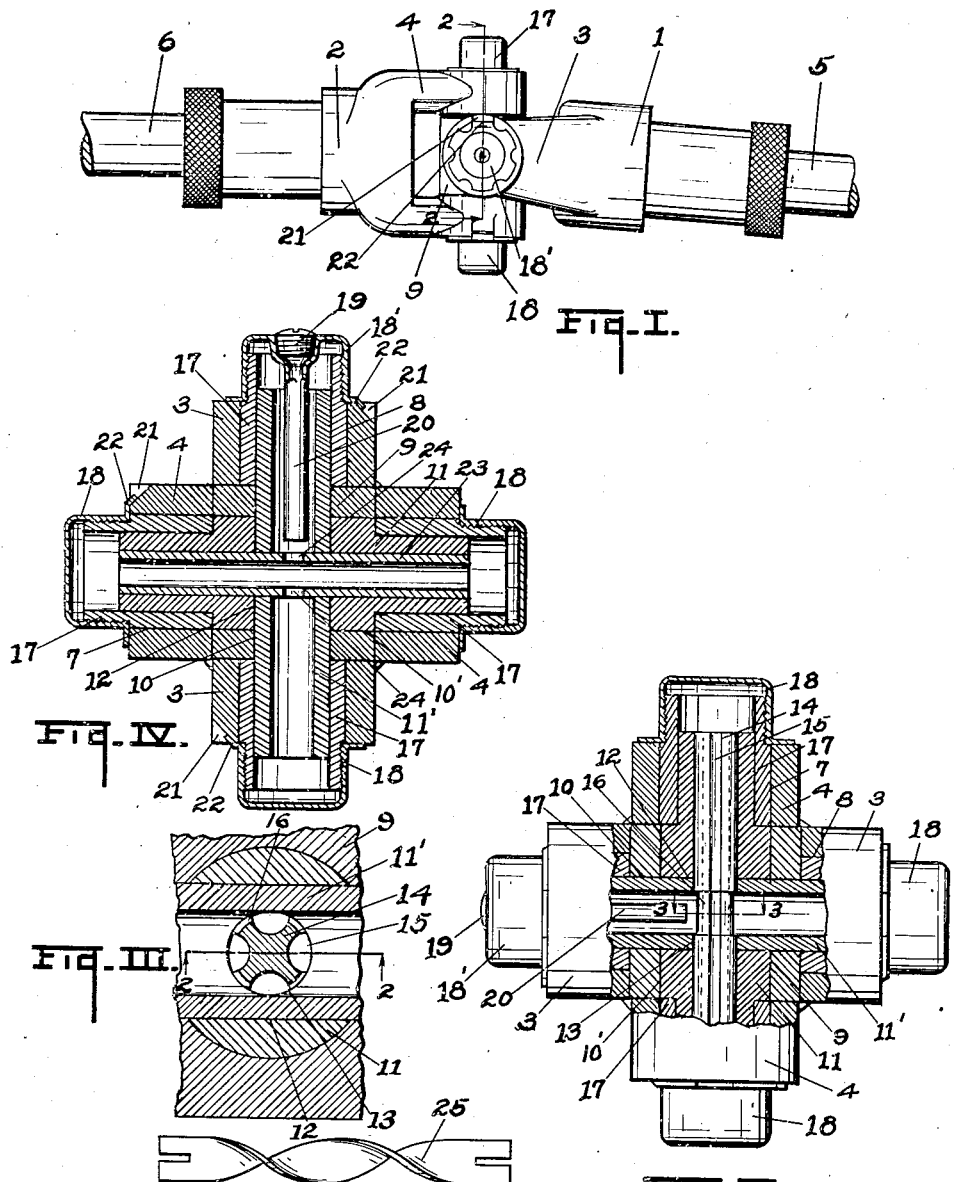
Inventor
Leonard H. Mattingly

UNITED STATES PATENT OFFICE.

LEONARD H. MATTINGLY, OF ALLEGAN, MICHIGAN.

UNIVERSAL JOINT.

1,333,988.

Specification of Letters Patent.   Patented Mar. 16, 1920.

Application filed October 7, 1919. Serial No. 329,098.

*To all whom it may concern:*

Be it known that I, LEONARD H. MATTINGLY, a citizen of the United States, residing at Allegan, county of Allegan, State of Michigan, have invented certain new and useful Improvements in Universal Joints, of which the following is a specification.

This invention relates to improvements in universal joints.

The main objects of my invention are:

First, to provide an improved universal joint of the journal pin type which is provided with effective lubricating means.

Second, to provide an improved universal joint having these advantages which is comparatively simple and economical in structure and easily assembled.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a side view of a universal joint embodying the features of my invention.

Fig. II is a detail view partially in transverse section on a line corresponding to line 2—2 of Figs. I and III.

Fig. III is a detail section on a line corresponding to line 3—3 of Fig. II.

Fig. IV is a transverse section corresponding to that of Fig. II of a modified embodiment of my invention.

Fig. V is an elevation of a modified form of a locking pin.

In the drawing similar reference characters refer to similar parts throughout the several views, and the sectional views are taken looking in the direction of the little arrows at the ends of the section lines.

Referring to the drawing, the shaft members, 1 and 2, are provided with forks 3 and 4 respectively having journal pin bearing openings 7 and 8. The shaft members 1 and 2 are adapted to receive the shaft sections 5 and 6 to be coupled.

The block-like journal member 9 is provided with journal pin openings 10 and 10' disposed transversely or at right angles to each other. The diameter of the opening 10' is substantially greater than that of the opening 10. Journal pins 11 and 11' are arranged in these openings, the larger pin being provided with a transverse opening 12 registering with the smaller pin opening of the journal member, the smaller pin being arranged through this opening 12 of the larger pin and constituting a locking member therefor. Both journal pins are tubular. The smaller pin 11' has a hole 13 therein registering with the bore of the larger pin.

The locking pin 14 is arranged through the pin 11 and through the transverse opening 13 of the pin 11', locking this pin in place. The locking pin has longitudinal grooves 15 therein permitting the passage of lubricant from end to end of the larger pin. It has a reduced central portion 16 within the bore of the smaller pin 11' permitting the passage of lubricant from end to end of that pin.

The bushings 17 project beyond the shaft members and are threaded to receive the caps 18 which close the outer ends of the bearings and in connection with the pieces within the pins described, form a cruciform lubricant chamber communicating with all the bearings of the joint.

One of the caps, designated as 18', is provided with a filling opening in its end which is closed by the plug 19. A filler tube 20 depends from this cap longitudinally of the smaller journal pin well to the center of the joint.

By means of a force feed lubricant injector, the joint may be filled with lubricant from the cap 18' and it is found that the lubricant is retained for a long period of time so that the joint requires very little attention.

To retain the caps, the shaft members are notched at 21 and portions of the flanges 22 of the caps are deflected or bent down to these notches, thus preventing the loosening of the caps by unscrewing. As it is not necessary to remove the caps to lubricate the joint, this manner of securing them is highly satisfactory in that it is very secure and also, it has the advantage of being economical.

In the modification shown in Fig. IV, the locking pin 23 is tubular and has openings 24 therein communicating with the bore of the pin 11'.

In Fig. V, I show a locking pin 25 in the form of a piece of twisted steel. This also permits the passage of lubricant from end to end of the journal pins.

I have illustrated and described my improved universal joint in forms or adaptations which I regard as very satisfactory. I have not attempted to illustrate other adaptations which I contemplate as I believe the disclosure made will enable those skilled in the art to embody or adapt my improvements as may be desired.

Having thus described my invention, what I claim as new and desire to secure by Letters Patent, is:

1. In a universal joint, the combination of a pair of shaft members provided with journal pin bearing openings, a journal member provided with journal pin openings of different diameters disposed transversely, tubular journal pins disposed in said openings in said journal pin member, the larger pin being provided with a transverse hole registering with the smaller pin opening of the journal member, the smaller pin being disposed through said hole and having a transverse hole therein registering with the bore of the larger pin, a locking pin disposed in the bore of the larger journal pin and through the transverse opening of the smaller pin, said locking pin permitting the passage of lubricant from end to end of each journal pin, bushings for said shaft members, and caps carried by said bushings closing the outer ends of the bearings and providing a closed lubricant chamber, one of said caps being provided with a filler tube disposed longitudinally in the bore of the smaller pin and terminating near the center of the joint.

2. In a universal joint, the combination of a pair of shaft members provided with journal pin bearing openings, a journal member provided with journal pin openings of different diameters disposed transversely, tubular journal pins disposed in said openings in said journal pin member, the larger pin being provided with a transverse hole registering with the smaller pin opening of the journal member, the smaller pin being disposed through said hole and having a transverse hole therein registering with the bore of the larger pin, a locking pin disposed in the bore of the larger journal pin and through the transverse opening of the smaller pin, said locking permitting the passage of lubricant from end to end of each journal pin, bushings for said shaft members, and caps carried by said bushings closing the outer ends of the bearings and providing a closed lubricant chamber.

3. In a universal joint, the combination of a pair of shaft members provided with journal pin bearing openings, a journal member provided with journal pin openings of different diameters disposed transversely, tubular journal pins disposed in said openings in said journal pin member, the larger pin being provided with a transverse hole registering with the smaller pin opening of the journal member, the smaller pin being disposed through said hole and having a transverse hole therein registering with the bore of the larger pin, a locking pin disposed in the bore of the larger journal pin and through the transverse opening of the smaller pin, said locking pin permitting the passage of lubricant from end to end of each journal pin.

In witness whereof I have hereunto set my hand and seal in the presence of two witnesses.

LEONARD H. MATTINGLY. [L. S.]

Witnesses:
R. G. URCH,
LAURA WEBER.